United States Patent [19]

Nagasawa

[11] Patent Number: 4,623,153
[45] Date of Patent: Nov. 18, 1986

[54] RADIAL OIL SEAL

[75] Inventor: Shinji Nagasawa, Fukushima, Japan

[73] Assignee: NOK Corporation, Tokyo, Japan

[21] Appl. No.: 822,803

[22] Filed: Jan. 27, 1986

[30] Foreign Application Priority Data

Apr. 16, 1985 [JP] Japan .................. 60-56455[U]
May 11, 1985 [JP] Japan .................. 60-69837[U]

[51] Int. Cl.⁴ .............................. F16J 15/32
[52] U.S. Cl. .................... 277/153; 277/166
[58] Field of Search ........... 277/152, 153, 166, 178, 277/181, 186, 189

[56] References Cited

U.S. PATENT DOCUMENTS

| 2,172,325 | 9/1939 | Victor et al. | 277/153 X |
| 3,099,454 | 7/1963 | Walinski | 277/153 X |
| 4,053,166 | 10/1977 | Domkowski | 277/152 |

FOREIGN PATENT DOCUMENTS 3125688 1/1983 Fed. Rep. of Germany ...... 277/152
680922 1/1965 Italy ................................. 277/153

Primary Examiner—Robert S. Ward
Attorney, Agent, or Firm—Kenyon & Kenyon

[57] ABSTRACT

An improved radial oil seal adapted to be disposed between a housing bore and a rotation shaft inserted therein for sealing of fluid in a housing. The radial oil seal includes a first seal ring having a rubber seal lip in sealing contact with the rotation shaft, a second seal ring having a synthetic resin seal lip and disposed at the air side of and adjacent the first seal ring, the synthetic resin seal lip extending along the back face of the rubber seal lip and being in sealing contact with the rotation shaft. A reinforcing ring having a substantial rigidity is disposed at the air side of and adjacent the second seal ring and curved along a bent portion of the synthetic resin seal lip so as to support the back face of the bent portion. An outer ring is fitted into the housing bore for firmly holding the radially outer portions of the first and second seal rings and the reinforcing ring.

12 Claims, 12 Drawing Figures

FIG. 11 *Prior Art*
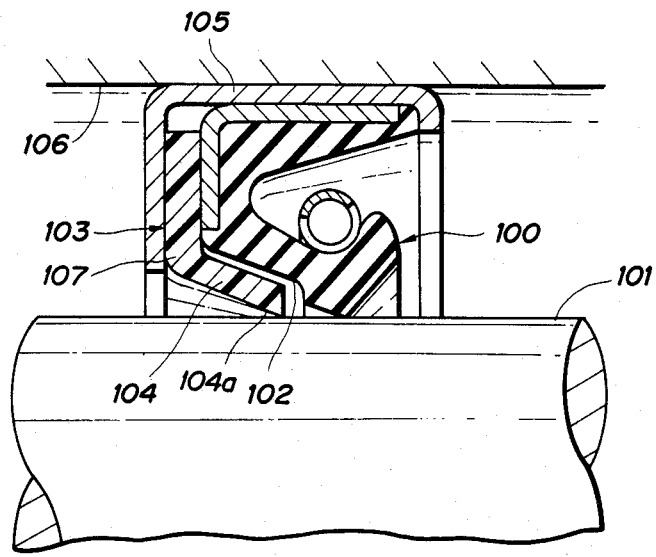
FIG. 12 *Prior Art*
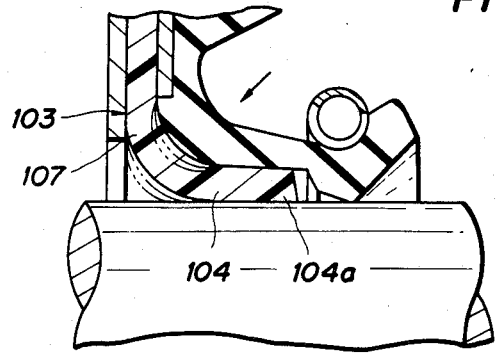

RADIAL OIL SEAL

BACKGROUND OF THE INVENTION

1. Field of the Invention

The present invention relates to a radial oil seal having a first seal ring with a seal lip formed of rubber and a second seal ring with a seal lip formed of synthetic resin integrally assembled with each other.

2. Description of the Prior Art

There has hitherto been known a conventional type of radial oil seal which is, for example, shown in FIG. 11 (c.f. Japanese utility model registration application laid open to public inspection under Serial No. 43-1971). Specifically, in FIG. 11, reference numeral 100 designates a first seal ring having a seal lip 102 of rubber extending axially to the sealed fluid side or to the right in FIG. 11, the distal end or edge of the rubber seal lip 102 being in sealing contact with the outer peripheral surface of a rotation shaft 101 so as to form a first seal part. Reference numeral 103 designates a second seal ring having a seal lip 104 of synthetic resin extending axially toward the sealed fluid side along the back face of the rubber seal lip 102, the distal end or edge of the synthetic resin seal lip 104 being in sealing contact with the outer peripheral surface of the rotation shaft 101 so as to form a second seal part. The first and second seal rings 100, 103 are integrally assembled in this order to an outer ring 105 of metal press fitted into a housing 106 from the sealed fluid side. Here, it is to be note that although the seal lip 104 of synthetic resin is excellent in sliding property and anti-friction property, it involves the disadvantages that the sliding surface of the seal lip 104, if it is used independently or singly, is liable to be injured upon insertion thereinto of the ratation shaft 101, and it takes a relatively long time for the sliding surface of the seal lip 104 to come in intimate contact with the relatively coarse surface of the rotation shaft 101, thus resulting in an initial-period leakage of fluid to be sealed. In view of this, the seal lip 104 of synthetic resin is ordinarily used in combination with a rubber seal lip, as referred to above and shown at 102 in FIG. 11, so that effective sealing is made by means of the rubber seal lip 102 so as to prevent any possible initial-period leakage of fluid until the time when the sliding surface of the synthetic resin seal lip 104 comes in intimate sealing contact with the coarse surface of the rotation shaft 101. On the other hand, the rubber seal lip 102, when subjected to a high pressure, increases in sliding resistance thereby to accelerate sliding wear thereon as the contact pressure per unit area of the rubber seal lip 102 against the rotation shaft 101 increases, and hence the rubber seal lip 102 is not suitable for sealing of the fluid under high pressure. Such a situation can be improved by means of the seal lip 104 of synthetic resin which serves to support the back face of the rubber seal lip 102 so as to share the pressure applied by the fluid to be sealed to the rubber seal lip 102, as a consequence of which an increase in contact pressure per unit area of the rubber seal lip 102 against the rotation shaft 101 is suppressed in an effective manner, thereby permitting the rubber seal lip 102 to serve for sealing of high pressure fluid for an extended period of use.

With the conventional type of radial oil seal as described above, however, a bent portion 107 of the synthetic resin seal lip 104 is low in bending strength in the dirction in which the pressure of the fluid to be sealed is applied to the seal lip 104, so that the synthetic resin seal lip 104 is easily caused to deform under the fluid pressure applied thereto through the rubber seal lip 102 with its lip end 104a being displaced toward the air side to make the back face of the seal lip 104 in areal contact with the outer periphery of the rotation shaft 101 in place of the line contact therebetween, thus increasing the area of contact therebetween to a substantial extent. As a result, the pressure of contact per unit area of the synthetic resin seal lip 104 against the rotation shaft 101 is accordingly reduced to lower the sealing performance. In addition, the sliding surface of the synthetic resin seal lip 104 is liable to be injured by dust coming into the housing 106 from the ambient air, giving rise to a leakage of fluid to be sealed.

SUMMARY OF THE INVENTION

In view of the above, the present invention is intended to obviate the above-mentioned various problems of the prior art radial oil seal.

A primary object of the present invention is to provide a novel and improved radial oil seal of the type described above in which the bent portion of the synthetic resin seal lip is effectively prevented from its excessive deformation so as to avoid the areal contact of the sliding surface of the synthetic resin seal lip with the rotation shaft even when subjected to a high pressure of fluid to be sealed, and which has thus an improved sealing performance particularly to a high pressure fluid.

A subsidiary object of the present invention within the framework of the above-mentioned primary object is to provide a novel and improved radial oil seal of the type described above which is capable of preventing the sliding surface of the synthetic resin seal lip from being injured by dust coming from the ambient air.

Another subsidiary object of the present invention within the framework of the above-mentioned primary object is to provide a novel and improved radial oil seal of the type described above which can be dismantled or removed from a bore formed in the housing in a very easy and simple manner.

In order to achieve the above-mentioned primary object, according to the present invention, there is provided a radial oil seal adapted to be disposed between the inner peripheral surface of a bore in a housing and the outer peripheral surface of a rotation shaft inserted into the housing bore for sealing fluid in the housing, the radial oil seal comprising a first seal ring having a seal lip formed of rubber, the seal lip being in contact at its distal end with the outer peripheral surface of the rotation shaft so as to provide a first sealing part; a second seal ring having a seal lip formed of synthetic resin and disposed at the air side of and adjacent the first seal ring, the synthetic resin seal lip extending along the back face of the rubber seal lip and being in contact at its distal end with the outer peripheral surface of the rotational shaft so as to provide a second sealing part; a reinforcing ring having a substantial rigidity and disposed at the air side of and adjacent the second seal ring, the reinforcing ring being curved along a bent portion of the synthetic resin seal lip so as to support the back face of the bent portion; and an outer ring adapted to be fitted into the inner peripheral surface of the housing bore for firmly holding the radially outer peripheral portions of the first and second seal rings and the reinforcing ring.

According to the above construction, the bent portion of the synthetic resin seal lip, being low in bending strength, is reinforced by the reinforcing ring and thus prevented from its excessive bending so that there is no deformation of the synthetic resin seal lip under application of a high pressure of the fluid to be sealed and hence no areal contact of the back face of the synthetic resin seal with the surface of the rotation shaft. As a result, the distal end or edge of the synthetic resin seal lip is maintained substantially in a line contact with the rotation shaft so that the pressure of contact per unit area of the synthetic resin seal lip against the rotation shaft can be made high, thereby improving the sealing performance under high pressure to a practical extent.

Further, in accordance with a preferred form of the invention, at the air side of the reinforcing ring there is disposed a dust seal ring which is provided with a dust lip having its distal end or edge in contact with the outer peripheral surface of the rotation shaft so as to form a third sealing part. With this arrangement, invasion of dust into the housing from the outside is securely prevented by means of the dust lip of the dust seal ring so that the sliding surface of the synthetic resin seal lip of the second seal ring, which is disposed inwardly of the dust seal ring, is protected from injury by dust, thus materially improving the durability thereof.

Also, in accordance with another preferred form of the invention, a removal-assisting member is connected with the outer ring and adapted to be engaged by a removing jig. Thus, by engaging the removing jig with the removal-assisting member, the entire radial oil seal can be removed or dismantled from the hosing bore in a very easy and simple manner, whereby the time required for replacement of the radial oil seal is considerably reduced to enhance the working efficiency to a substantial extent.

The above and other objects, features and advantages of the present invention will become apparent from the following detailed description of several preferred embodiments of the invention when taken in conjunction with the accompanying drawings.

BRIEF DESCRIPTION OF THE ACCOMPANYING DRAWINGS

FIG. 11 is a vertical cross section showing essential parts of a conventional type of radial oil seal; and FIG. 12 is a vertical cross section, in part, of the radial oil seal illustrated in FIG. 11, showing the state in which the radial oil seal is subjected at its one side to a high pressure of the fluid to be sealed.

DESCRIPTION OF THE PREFERRED EMBODIMENTS

Now, the invention will be described in conjunction with several presently preferred embodiments thereof by referring to the accompanying drawings. In the following description and the accompanying drawings, the same or corresponding parts of the radial oil seal are identified by the same references throughout the various embodiments.

Figure 1:
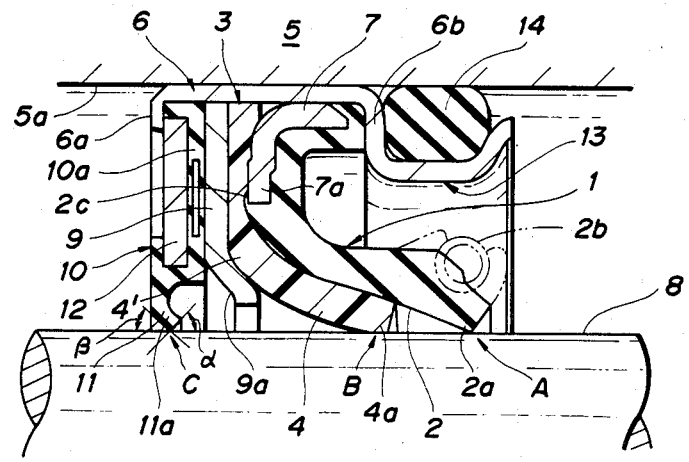
FIG. 1 is a vertical cross section showing essential parts of a radial oil seal in accordance with a first embodiment of the present invention.

FIG. 1 shows a radial oil seal in accordance with a first embodiment of the present invention. In FIG. 1, a rotation shaft 8 is inserted into a cylindrical bore 5a formed in a housing 5. Between the outer peripheral surface of the rotation shaft 8 and the inner peripheral surface of the housing bore 5a there is disposed a radial oil seal constructed in accordance with the principles of the present invention which serves to seal a fluid such as, for example, an oil stored in the housing 5 from the outside.

The radial oil seal comprises a first seal ring 1 having a seal lip 2 formed of rubber, the seal lip 2 extending to the sealed fluid side or to the right in FIG. 1, and a second seal ring 3 having a seal lip 4 formed of synthetic resin, these seal rings 1 and 3 being assembled or secured to a cylindrical outer ring 6 of metal between its radially inwardly extending flanges 6a and 6b formed at the opposite ends thereof, the outer ring 6 being fitted into the housing bore 5a. The seal lip 4 of the second seal ring 3 may be formed of synthetic resins such as, for example, PTFE (polytetrafluoroethylene), FEP (tetrafluoroethylenehexafluoropropylene copolymer), PFA (tetrafluoroethyleneperfluoroalkoxide), EPFE (ethylene-tetrafluoroethylene copolymer), polyether-ether ketone, and high molecular polyethylene. Also, mixtures of one of these synthetic resins with one or more of fillers such as short glass fiber, short carbon fiber, metal fiber, short ceramics fiber, whiskers, graphite powder, metal powder, glass powder, ceramics powder, and synthetic resin powder may be used so as to afford an excellent wear-resistant property and a low coefficient of friction to the seal lip 4.

The first seal ring 1 is constructed such that the rubber seal lip 2 is integrally secured by baking at its outer peripheral portion to an inner metal ring 7 of substantially inverted L-shaped cross section which is directly fitted at its outer peripheral surface into the inner peripheral surface of the outer ring 6. The inner ring 7 is integrally formed at its air-side end with a radially inwardly extending annular flange 7a, from the radially inner peripheral end of which flange does the rubber seal lip 2 extend radially inwardly and axially toward the fluid to be sealed so that the lip end or distal end 2a of the rubber seal lip 2 is placed in contact with the surface of the rotation shaft 8 to form a first sealing part A. In this connection, it is to be noted that as indicated by chain-dotted line in FIG. 1, an annular spring 2b may be mounted around the outer surface of the distal end 2a of the rubber seal lip 2 so as to adjust or increase the fastening or contacting force of the rubber seal lip 2 against the rotation shaft 8.

The second seal ring 3 is formed of a plate-like disc of synthetic resin as referred to above and has its radially inner portion extending along the back face of the rubber seal lip 2 and being bent at 4' axially toward the fluid to be sealed. The second seal ring 3 is integrally formed at its radially inner side with the annular seal lip 4 of synthetic resin in the form of a truncated cone. The inside diameter of the distal end or radially inner end 4a of the seal lip 4 is slightly less than the outside diameter of the rotation shaft 8 so that the seal lip inner end 4a, when fitted over the rotation shaft 8, is enlarged in its diameter and thereby given a fastening force under the action of its own elatic deformation. Thus, the distal end 4a of the seal lip 4 in contact with the surface of the rotation shaft 8 provides a second sealing part B. The distal end 4a of the seal tip 4 extends toward a location near the distal end or radially inner end 2a of the rubber seal lip 2 so as to support the pressure applied by the sealed fluid in the housing 5 to the rubber seal lip 2.

At the air side of the second seal ring 3 is disposed an annular plate-like reinforcing ring 9 which is formed of rigid material such as metal. The reinforcing ring 9 is provided at its radially inner side with an annular tapered portion 9a in the form of a truncated cone having an angle of inclination corresponding to that of the bent portion 4' of the synthetic resin seal lip 4. The reinforcing ring 9 is fitted at its radially outer periphery into the inner peripheral surface of the outer ring 6 so as to position the tapered portion 9a in place.

At the air side of the reinforcing ring 9 there is disposed a dust seal ring 10 which has a dust lip 11 integrally connected by baking to a metal ring 12, the dust lip 11 being placed in contact at its distal end 11a with the outer peripheral surface of the rotation shaft 8 so as to provide a third sealing part C. The dust lip 11 is inclined axially toward the sealed fluid side in a manner such that an angle α of contact of the V-shaped distal end 11a or radially inner end of the dust lip 11 relative to the rotation shaft 8 at the sealed fluid side is set larger than an angle of contact β at the air side, whereby the dust lip 11 not only prevents dust in the outside air from entering the housing bore 5a but also acts as a seal for sealing leakage fluid past the rubber seal lip 2 and the synthetic resin seal lip 4.

The first seal ring 1 has a rubber portion 2c integrally formed with the rubber seal lip 2, the rubber portion 2c being secured by baking to the air-side surface of the annular flange 7a of the inner ring 7 along the entire circumference thereof for sealing between the first and second seal rings 1 and 3. Similarly, the dust lip 11 is integrally formed with a rubber portion 10a which is secured by baking to the sealed fluid-side surface and the radially outer periphery of the metal ring 12 along the entire circumference thereof for sealing between the second seal ring 3 and the metal ring 12 as well as between the radially outer peripheral surface of the metal ring 12 and the inner peripheral surface of the outer ring 6, respectively.

The flange 6b of the outer ring 6 lying at the sealed fluid side innitially extends radially inward and is then bent axially toward the sealed fluid side and further bent radially outwardly to form an annular recess 13 of substantially channel-shaped cross section, into which recess is mounted an O ring 14 for sealing between the outer ring 6 and the inner surface of the housing bore 5a.

With the above-described construction of the radial oil seal, the distal ends 2a, 4a and 11a, respectively, of the rubber seal lip 2, the synthetic resin seal lip 4 and the dust lip 11 are in contact with the outer peripheral surface of the rotation shaft 8 successively in this order from the sealed fluid side so that the fluid in the housing 5 is thereby sealed in a triple manner. As a result, during the initial period of mounting of the radial oil seal into the housing bore 5a, the fluid in the housing 5 is sealed by the rubber seal lip 2 which is excellent in the tight-fitting capability and in the ability to trace fine irregularities on the surface of the rotation shaft 8, and which is thus placed in tight or intimate contact at its distal end 2a with the rotation shaft 8. In this manner, any possible initial-period leakage of the fluid to be sealed is reliably avoided.

In addition, the pressure applied by the fluid to be sealed to the rubber seal lip 2 is shared by the synthetic resin seal lip 4. More specifically, since the synthetic resin seal lip 4 is formed such that the distal end 4a thereof extends to a location near the distal end 2a of the rubber seal lip 2, the greater part of the pressure applied to the rubber seal lip 2 is supported by the distal end 4a of the synthetic resin seal lip 4 having a low coefficient of friction, as a consequence of which an excessive increase in the contact pressure per unit area at the distal end 2a of the rubber seal lip 2 is effectively suppressed thereby to minimize an increase in the sliding resistance to the rotation shaft 8 even under a high pressure of the fluid to be sealed. Moreover, the bent portion 4' of the synthetic resin seal lip 4 is supported by the conical tapered portion 9a of the reinforcing ring 9 so that the synthetic resin seal lip 4, when subjected to a high pressure, is maintained at a predetermined angle of inclination relative to the axis of the rotation shaft 8 by means of the tapered portion 9a of the reinforcing ring 9, thus holding the distal end 4a of the synthetic resin seal lip 4 substantially in line contact with the rotation shaft 8 so as to suppress the increasing area of contact therebetween. Accordingly, the contact pressure per unit area at the distal end 4a of the synthetic resin seal lip 4 is high and a good sealing performance is maintained even when the fluid to be sealed is under high pressure.

On the other hand, dust in the ambient air is positively prevented from entering the housing bore 5a by means of the distal end 11a of the dust lip 11, whereby the sliding surface of the synthetic resin seal lip 4 is protected from the outside dust.

Figure 2:
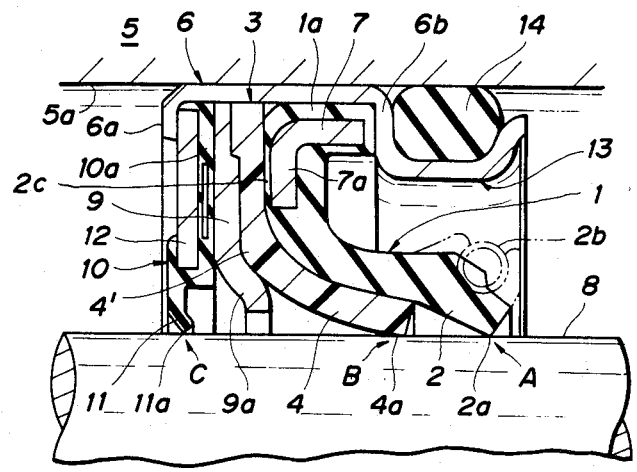
FIG. 2 is a vertical cross section showing essential parts of a radial oil seal in accordance with a second embodiment of the present invention.

FIG. 2 shows a second embodiment of the present invention which is only different from the above-mentioned first embodiment in the features that the inner ring 7 of the first seal ring 1 is provided, at the outer peripheral surface thereof fittingly engaging the outer ring 6, with a rubber portion 1a for improving the sealing between the outer and inner rings 6 and 7, the rubber portion 1a being integrally formed with the rubber seal lip 2 and secured by baking the inner ring 7.

Figure 3:
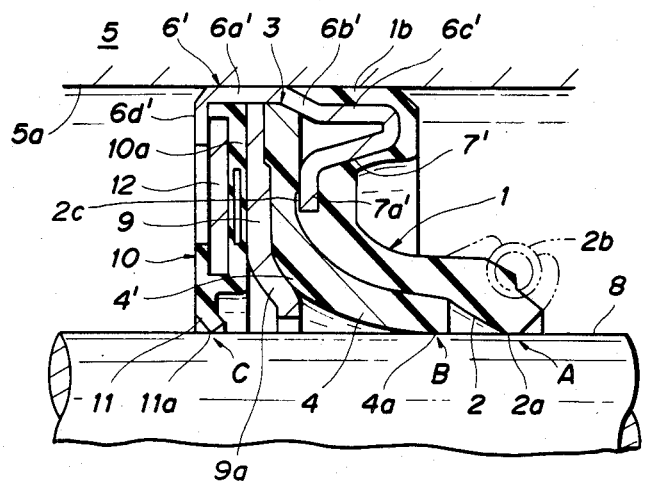
FIG. 3 is a vertical cross section showing essential parts of a radial oil seal in accordance with a third embodiment of the present invention.

FIG. 3 shows a third embodiment of the present invention in which the first seal ring 1 is integrally formed with the outer ring 6'. Specifically, the axially inner end portion of the outer ring 6' lying on the sealed fluid side is turned back axially toward the air side and then bent radially inwardly at its distal end so as to provide the inner ring 7'. The outer ring 6' comprises a large-diameter portion 6a' having an annular flange 6d'' on the air side, and a small-diameter portion 6c' on the sealed fluid side and integrally connected through a stepped portion 6b' with the large-diameter portion 6a'. The second seal ring 3, the reinforcing ring 9 and the dust seal ring 10 are fixedly held together at their radially outer peripheries by the stepped portion 6b' and the annular flange 6d'. Further, the inner ring 7', the small-diameter portion 6c' and the stepped portion 6b' of the outer ring 6' are provided at their outer peripheral surfaces with a rubber member 1b for sealing between the outer ring 6' and the housing bore 5a, the rubber member 1b being integrally formed with the radially outer peripheral portion of the first seal ring 1 and secured by baking to the inner ring 7' and the outer ring 6'. The above construction provides for a reduction in number of component parts and omits the O ring 14 as used in the embodiments illustrated in FIGS. 1 and 2.

Figure 4:
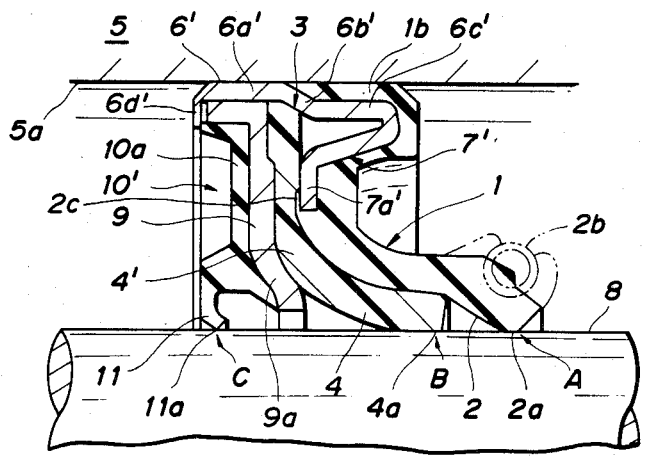
FIG. 4 is a vertical cross section showing essential parts of a radial oil seal in accordance with a fourth embodiment of the present invention.

Although the above-mentioned third embodiment illustrated in FIG. 3, the first seal ring 1 is integrally formed with the outer ring 6', the dust seal ring 10' may be integrally secured by baking to the reinforcing ring 9, as shown in FIG. 4.

Figure 5:
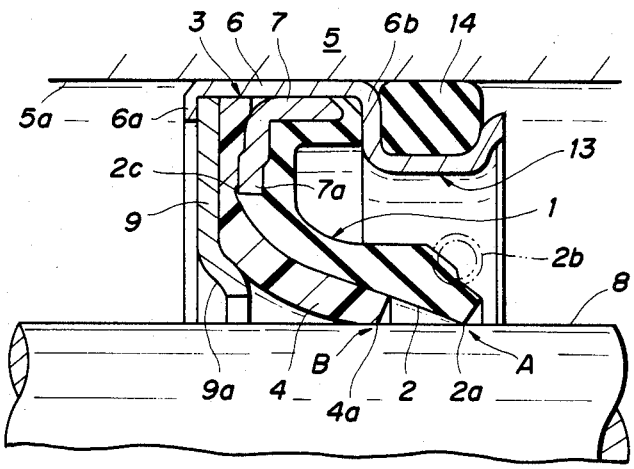
FIG. 5 is a vertical cross section showing essential parts of a radial oil seal in accordance with a fifth embodiment of the present invention.

FIG. 5 shows a further embodiment of the present invention which is substantially similar to the first embodiment shown in FIG. 1 excepting that the dust seal ring 10 of FIG. 1 is omitted for simplified construction.

Figure 6:
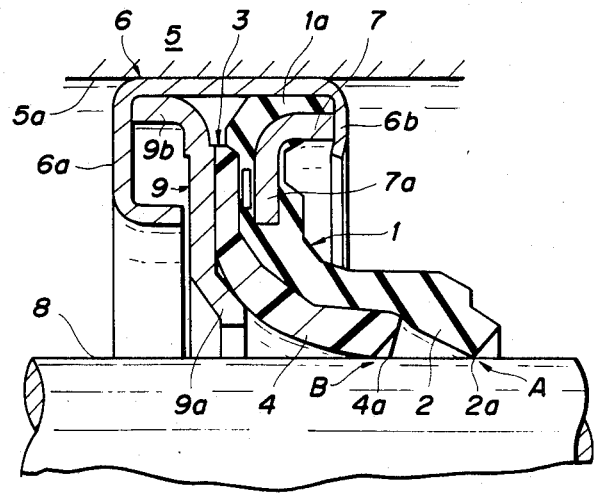
FIG. 6 is a vertical cross section showing essential parts of a radial oil seal in accordance with a sixth embodiment of the present invention.

FIG. 6 shows a still further embodiment of the present invention which is substantially similar to the second embodiment shown in FIG. 2 except for the following features. Namely, in this embodiment, the outer ring 6 is not provided with any annular recess 14 of channel-shaped cross section, as shown in FIG. 2, which is integrally formed with the flange 6b at the fluid-side end of the outer ring 6 for mounting of the O ring 14. Instead, the flange 6b of the outer ring 6 is slightly bent inwardly at its radially inner peripheral end. Also, the dust seal ring of FIG. 2 is omitted, and the reinforcing ring 9 has its radially outer peripheral portion 9b bent toward the air side with its outer end face being in abutting engagement with the air-side flange 6a of the outer ring 6. The radially inner peripheral end of the flange 6a is bent axially inwardly toward the sealed fluid side for improved rigidity thereof. Upon assembly, the end face of the axially inwardly bent end portion of the flange 6a is placed in abutting engagement with the air-side surface of the reinforcing ring 9 so as to expedite the assemblying operation. The arrangement and operation of this embodiment other than the above are substantially similar to those of the second embodiment.

Figure 7:
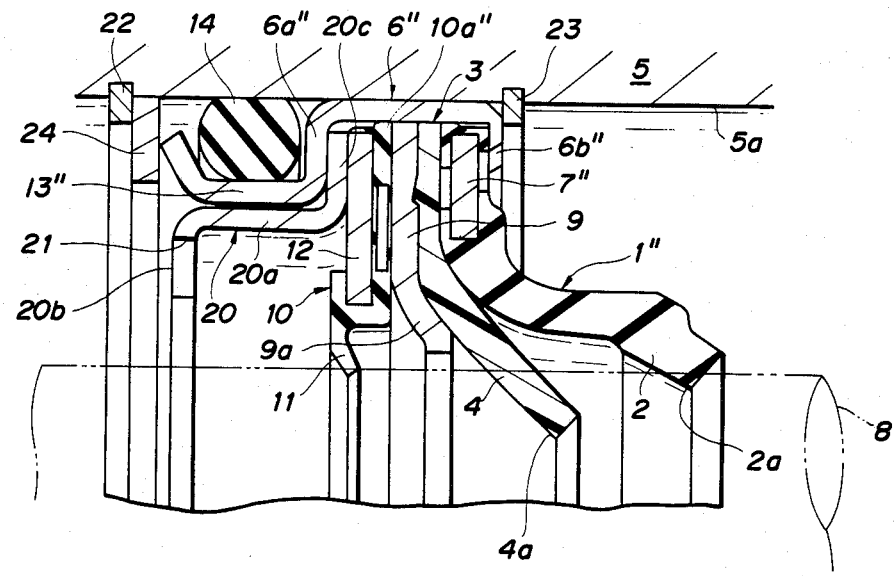
FIG. 7 is a vertical cross section showing essential parts of a radial oil seal in accordance with a seventh embodiment of the present invention.
Figure 8:
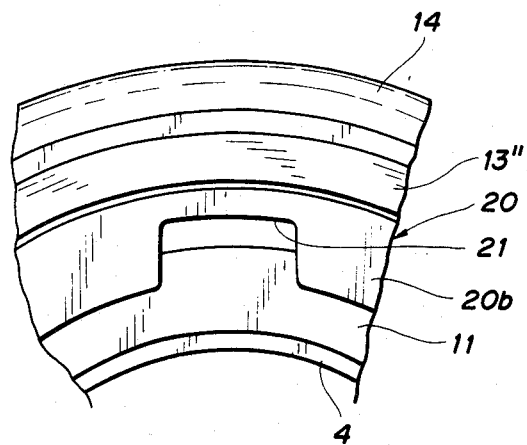
FIG. 8 is a front elevational view, in part, of the radial oil seal of FIG. 7, showing an engagement flange of a removal-assisting member.

FIGS. 7 and 8 show a further embodiment of the present invention. In these Figures, an outer ring 6'' of metal, being fitted in a cylindrical bore 5a in a housing 5, is integrally formed at its air-side end with a radially inwardly extending annular flange 6a'' and at its sealed fluid-side end with a radially inwardly extending annular flange 6b''.

Between these flanges 6a'' and 6b'' there are disposed successively from the sealed fluid side a first seal ring 1'' having a rubber seal lip 2 and an inner ring 7'' of an annular metal plate embedded in the radially outer portion of the rubber seal lip 2; a second seal ring 3 having a seal lip 4 formed of an annular plate of synthetic resin such as tetrafluoroethylene resin; a reinforcing ring 9 formed of an annular metal plate for supporting the synthetic resin seal lip 4; and a dust seal ring 10 having a dust lip 11 of rubber secured by baking to the radially inner peripheral portion of a plate-like metal ring 12, and a rubber member 10a'' integrally formed with the dust lip 11 and secured by baking to the air-side surface and the radially outer end face of the metal ring 12. The first seal ring 1'', the second seal ring 3, the reinforcing ring 9 and the dust seal ring 10 are caulked and assembled together at their radially outer peripheral portions by the opposed flanges 6a'' and 6b'' of the outer ring 6. Here, it should be noted that the first and second seal rings 1'' and 3, the reinforcing ring 9 and the dust seal ring 10 are substantially similar in construction and operation to those of the aforesaid first embodiment shown in FIG. 1.

On the other hand, the air-side flange 6a'' of the outer ring 6'' is bent initially axially toward the air side and then radially outwardly to form an annular recess 13'' of substantially channel-like cross section, into which recess is mounted an O ring 14 for sealing between the outer ring 6'' and the housing bore 5a.

In further accordance with this embodiment, provision is made for a removal-assisting member 20 which is connected with the outer ring 6'' so as to expedite the removal of the entire radial oil seal assembly from the housing bore 5a. In the illustrated embodiment of FIG. 7, the removal-assisting member 20 is formed of metal and comprises a cylindrical section 20a disposed adjacent the radially inner surface of the annular recess 13'' in the outer ring 6'', an annular engagement flange 20b integrally formed with the air-side end of the cylindrical section 20a and extending therefrom radially inwardly, and an annular mounting flange 20c integrally formed with the sealed fluid-side end of the cylindrical section 20a and extending therefrom radially outwardly. The mounting flange 20c is fixedly clamped between the air-side flange 6a'' of the outer ring 6'' and the metal ring 12 of the dust seal ring 10 and thus integrally connected with the air-side flange 6a''. As clearly shown in FIG. 8, the engagement flange 20b of the removal-assisting member 20 is provided at its radially inner peripheral portion with a plurality (four in the illustrated embodiment) of notches 21 which are adapted to be engaged by a removing jig 25 (see FIG. 9) to be described later in detail, and which are arranged in the circumferential direction at appropriate (preferably equal) intervals.

In FIG. 7, reference numerals 22 and 23 designate a pair of snap rings for fixedly holding the opposite ends of the radial oil seal assembly or the outer ring 6'' relative to the housing 5, and reference 24 designates a washer interposed between the the outer or air-side end of the outer ring 6'' and the snap ring 22 adjacent thereto.

Figure 9:
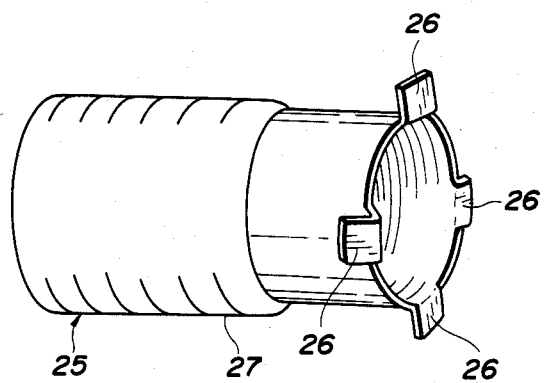
FIG. 9 is a perspective view of a removing jig adapted to be engaged with the engagement flange of the removal-assisting member illustrated in FIG. 8.

FIG. 9 shows an example of the removing jig 25. In this example, the removing jig 25 is generally in the form of a cylinder and is provided at its one end with a plurality (four in this example) of radially outwardly extending engagement projections 26 which are spaced from each other in the circumferential direction at appropriate intervals corresponding to those of the notches 21 in the engagement flange 20b of the removal-assisting member 20 of the radial oil seal. The engagement projections 26 are sized such that they can pass through the corresponding notches 21 in the engagement flange 20b. A grip 27 is formed at the other end of the cylindrical removing jig 25.

The radial oil seal as illustrated in FIGS. 7 and 8 can be removed from the housing bore 5a by using the removing jig 25 in the following manner. First, the air-side snap ring 22 is removed from the housing 5 and the engagement projections 26 of the removing jig 25 are then inserted into the notches 21 in the engagement flange 20b of the removal-assisting member 20. Thereafter, the removing jig 25 with its engagement projections 26 thus inserted into the notches 21 is turned to place the engagement projections 26 in abutting engagement with the back face of the engagement flange 20b. In this state, by pulling out the removing jig 25 in the axial direction, one can remove the entire radial oil seal assembly from the housing bore 5a.

It will be appreciated that although in the embodiment illustrated in FIGS. 7 and 8, the removal-assisting member 20 is formed separately from the outer ring 6'', it may be formed integrally with the outer ring 6''. Also, the removal-assisting member 20 may be first formed separately from the outer ring 6'' and then attached to the outer ring 6'' by appropriate fastening means such as welding, bolting and the like before assembly of the entire radial oil seal. Further, the removal-assisting member 20 may be formed integrally with the dust seal ring 10 or may be formed separately from the dust seal ring 10 and attached thereto by appropriate fastening means.

Figure 10:
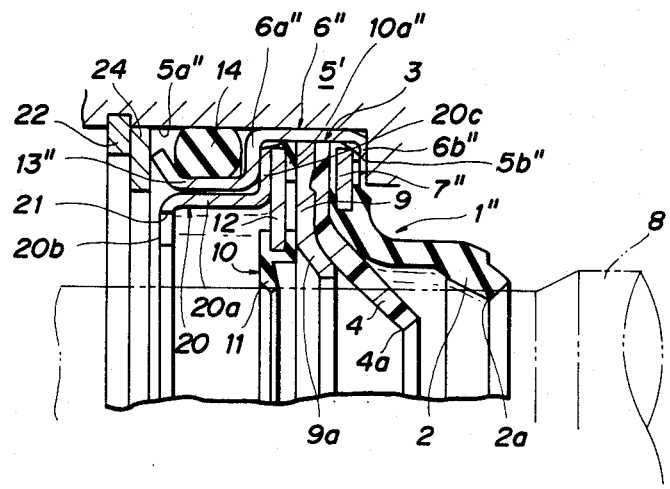
FIG. 10 is a vertical cross section showing essential parts of a modified form of housing with the radial oil seal illustrated in FIG. 7 being fitted therein.

FIG. 10 shows a modified form of housing into which is mounted the radial oil seal shown in FIGS. 7 and 8. As seen from FIG. 10, this modified housing 5' differs from that shown in FIG. 7 in the features that the inner surface of a bore 5a'' in the housing 5' is stepped to form a shoulder 5b'' so that the outer ring 6'' is in abutting engagement at its sealed fluid-side flange 6b'' with the shoulder 5b'' in the bore 5a'', thereby omitting the snap ring 23 as used in the FIG. 7 embodiment. The arrangement and operation of this embodiment other than the above is substantially similar to those of the FIG. 7 embodiment.

While several preferred embodiments of the present invention have been shown and described, it will be clearly understood to those skilled in the art that various changes and modifications may be made therein without departing from the spirit and scope of the invention as defined in the appended claims.

What is claimed is:

1. A radial oil seal adapted to be disposed between the inner peripheral surface of a bore in a housing and the outer peripheral surface of a rotation shaft inserted into the housing bore for sealing fluid in the housing, the radial oil seal comprising: a first seal ring having a seal lip formed of rubber, the seal lip being in contact at its distal end with the outer peripheral surface of the rotation shaft so as to provide a first sealing part; a second seal ring having a seal lip formed of synthetic resin and disposed at the air side of and adjacent the first seal ring, the synthetic resin seal lip extending along the back face of the rubber seal lip and being in contact at its distal end with the outer peripheral surface of the rotation shaft so as to provide a second sealing part; a reinforcing ring having a substantial rigidity and disposed at the air side of and adjacent the second seal ring, the reinforcing ring being curved along a bent portion of the synthetic resin seal lip so as to support the back face of the bent portion; and an outer ring adapted to be fitted into the inner peripheral surface of the housing bore for firmly holding the radially outer peripheral portions of the first and second seal rings and the reinforcing ring.

2. A radial oil seal as set forth in claim 1, further comprising a dust seal ring disposed at the air side of the reinforcing ring and having a dust lip with its distal end being in contact with the outer peripheral surface of the rotation shaft so as to form a third sealing part.

3. A radial oil seal as set forth in claim 1, wherein the opposite ends of the outer ring are bent radially inwardly to fixedly caulk together the first and second seal rings and the reinforcing ring.

4. A radial oil seal as set forth in claim 2, wherein the opposite ends of the outer ring are bent radially inwardly to fixedly caulk together the first and second seal rings, the reinforcing ring and the dust seal ring.

5. A radial oil seal as set forth in claim 3, wherein the sealed fluid-side end of the outer ring is bent radially inwardly and then axially toward the sealed fluid side so as to form an annular recess, in which is mounted an O ring for sealing between the radially outer surface of the outer ring and the inner surface of the housing bore.

6. A radial oil seal as set forth in claim 1, wherein the outer ring comprises a large-diameter portion on the air side, and a small-diameter portion on the sealed fluid side and integrally connected through a stepped portion with the large-diameter portion, the small-diameter portion of the outer ring being turned back axially toward the air side and then bent radially inwardly at its distal end so as to provide an inner ring, and wherein the first seal ring extends along and is secured by baking to the outer peripheral surfaces of the small-diameter portion and the inner ring so that a space between the inner surface of the housing bore and the radially outer surface of the outer ring is sealed by means of that portion of the first seal ring which is disposed on the radially outer surface of the small diameter portion of the outer ring.

7. A radial oil seal as set forth in claim 6, wherein the stepped portion of the outer ring and the inner ring are in abutting engagement with the radially outer portion of the second seal ring, and wherein the air-side end of the outer ring is bent radially inwardly to fixedly caulk together, in cooperation with the stepped portion of the outer ring and the inner ring, the radially outer peripheral portions of the second seal ring and the reinforcing ring.

8. A radial oil seal as set forth in claim 1, further comprising a removal-assisting member connected to the outer ring and adapted to be engaged by a removing jig.

9. A radial oil seal as set forth in claim 8, wherein the removal-assisting member has a radially inwardly extending annular engagement flange engageable with the removing jig.

10. A radial oil seal as set forth in claim 9, wherein the annular engagement flange of the removal-assisting member is formed with notch means engageable with engagement projection means provided on the removal-assisting jig.

11. A radial oil seal as set forth in claim 8, wherein the removal-assisting member is formed separately from the outer ring and fixedly connected with the outer ring by bending the opposite ends of the outer ring radially inwardly so as to caulk together the first and second seal rings and the reinforcing ring along with the removal-assisting member.

12. A radial oil seal as set forth in claim 8, wherein the removal-assisting member is integrally formed with the outer ring.

* * * * *